United States Patent
Lee et al.

(10) Patent No.: US 7,759,013 B2
(45) Date of Patent: Jul. 20, 2010

(54) FUEL DELIVERY APPARATUS OF DIRECT LIQUID FEED FUEL CELL

(75) Inventors: Jae-yong Lee, Seongnam-si (KR); Hye-jung Cho, Anyang-si (KR)

(73) Assignee: Samsung SDI Co., Ltd., Suwon (KR)

( * ) Notice: Subject to any disclaimer, the term of this patent is extended or adjusted under 35 U.S.C. 154(b) by 1088 days.

(21) Appl. No.: 11/287,376

(22) Filed: Nov. 28, 2005

(65) Prior Publication Data
US 2006/0127743 A1   Jun. 15, 2006

(30) Foreign Application Priority Data
Dec. 15, 2004   (KR) .................... 10-2004-0106518

(51) Int. Cl.
*H01M 2/00* (2006.01)
*H01M 2/02* (2006.01)
*F22B 37/18* (2006.01)

(52) U.S. Cl. ..................... 429/452; 122/366
(58) Field of Classification Search ............... 122/366
See application file for complete search history.

(56) References Cited

U.S. PATENT DOCUMENTS

| 5,069,793 | A |   | 12/1991 | Kaschemekat et al. |
| 5,797,926 | A |   | 8/1998 | Mehl, Sr. |
| 5,823,252 | A | * | 10/1998 | Waitkat et al. ............. 165/166 |
| 6,303,244 | B1 |   | 10/2001 | Surampudi |
| 7,219,628 | B1 | * | 5/2007 | Krishnamurthy et al. .... 122/336 |
| 7,223,364 | B1 |   | 5/2007 | Johnston et al. |
| 2003/0103878 | A1 |   | 6/2003 | Morse et al. |
| 2004/0055329 | A1 |   | 3/2004 | Mathias et al. |
| 2005/0181251 | A1 | * | 8/2005 | Han et al. ..................... 429/26 |
| 2005/0211427 | A1 | * | 9/2005 | Kenny et al. ................ 165/299 |

FOREIGN PATENT DOCUMENTS

| CN | 1503390 | 6/2004 |
| JP | 57-019973 | 2/1982 |
| JP | 59-066066 | 4/1984 |
| JP | 06-188008 | 7/1994 |
| JP | 11-089551 | 4/1999 |
| JP | 2000-353533 | 12/2000 |
| JP | 2001-095109 | 4/2001 |

(Continued)

*Primary Examiner*—Patrick Ryan
*Assistant Examiner*—Ashley Kwon
(74) *Attorney, Agent, or Firm*—H. C. Park & Associates, PLC

(57) ABSTRACT

A fuel delivery apparatus for a direct liquid feed fuel cell is provided. The fuel delivery apparatus includes a plate stack formed by a one or more double-sided plates positioned between opposing end plates. Both sides of the one or more double-sided plates, and the interior side of each end plate, may include one or more microchannels that extend between, and link, an inlet port with an outlet port. The length of the microchannels is chosen to be less than the height of a predetermined meniscus so that liquid fuel propelled by capillary force forms a meniscus that stands proximate the interface between the ends of the microchannels and the outlet port. A heater may be located at the upper ends of the microchannels around the plate stack, to vaporize the liquid fuel at the meniscus.

8 Claims, 6 Drawing Sheets

FOREIGN PATENT DOCUMENTS

| | | |
|---|---|---|
| JP | 2003109633 | 4/2003 |
| JP | 2004-079244 | 3/2004 |
| JP | 2004-167433 | 6/2004 |
| JP | 2004-178818 | 6/2004 |
| WO | 02-086999 | 10/2002 |
| WO | 03/0499535 | 6/2003 |

* cited by examiner

FUEL DELIVERY APPARATUS OF DIRECT LIQUID FEED FUEL CELL

BACKGROUND OF THE INVENTION

This application claims the priority to and the benefit of Korean Patent Application No. 10-2004-0106518, filed on Dec. 15, 2004, in the Korean Intellectual Property Office, the disclosure of which is incorporated herein in its entirety by reference.

1. FIELD OF THE INVENTION

The present invention relates to a fuel delivery system which delivers liquid fuel, used in a direct liquid feed fuel cell, and more particularly, to a fuel delivery apparatus which delivers alcohol in a gaseous state to the anode of a direct liquid feed fuel cell.

2. DESCRIPTION OF THE RELATED ART

A direct liquid feed fuel cell generates electrical power by the electrochemical reaction between a fuel such as methanol or ethanol and an oxidizing agent such as oxygen, and has a high energy and power density. Since the direct liquid feed fuel cell consumes fuel directly, no external peripheral devices such as a fuel reformer are required, and the fuel is easily stored and supplied.

A direct liquid feed fuel cell has an electrolyte membrane 1 interposed between an anode 2 and a cathode 3, as illustrated in FIG. 1. The anode 2 and the cathode 3 respectively include fuel diffusion layers 22 and 32 for the supply and diffusion of fuel, catalyst layers 21 and 31 for the oxidation-reduction reaction of fuel, and electrode supporting layers 23 and 33. A catalyst for electrode reactions may be composed of a noble metal having good catalytic characteristics even at low temperatures, such as Pt. To prevent catalyst poisoning by reaction byproducts such as carbon monoxide, alloys containing transition metal such as Ru, Rh, Os, or Ni can also be used. The electrode supporting layers 23 and 33 are made of carbon paper or carbon cloth, and their surfaces are water-proofed for easy supply of fuel and discharge of reaction products. The electrolyte membrane 1 may be a polymer membrane with a thickness of 50-200 Å. A hydrogen ion exchange membrane containing moisture and having ionic conductivity is usually used as the electrolyte membrane 1.

Two electrochemical reactions occur in a direct methanol fuel cell (DMFC), which uses a mixture of methanol and water as fuel. At an anode reaction, fuel is oxidized, and at a cathode reaction, oxygen and hydrogen ions are reduced. The reactions are as follows:

Anode Reaction: $CH_3OH+H_2O \rightarrow CO_2+6H^++6e^-$

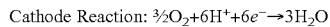

Cathode Reaction: $3/2 O_2+6H^++6e^- \rightarrow 3H_2O$

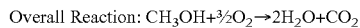

Overall Reaction: $CH_3OH+3/2 O_2 \rightarrow 2H_2O+CO_2$

A methanol molecule reacts with a water molecule at the anode 2 to produce a carbon dioxide molecule, six hydrogen ions, and six electrons. The hydrogen ions migrate to the cathode 3 through the electrolyte membrane 1 and react at the cathode 3 with oxygen and electrons, which are supplied via an external circuit, to produce water. That is, in the overall reaction in the DMFC, water and carbon dioxide are produced through the reaction of methanol with oxygen. Here, a molecule of methanol reacts with oxygen to produce 2 molecules of water.

The fuel is not pure methanol, but a mixture of methanol and water which is produced or stored in the system. When the concentration of methanol in the mixture is high, the electrical power generation performance is considerably decreased due to cross-over (a phenomenon in which fuel passes through the membrane) of the fuel in the electrolyte membrane (hydrogen ion exchange membrane). Thus, dilute methanol with a concentration of 0.5 to 2 M (2 to 8 vol. %) is generally used. However, when dilute methanol is stored in a fuel tank, the energy quantity is low since a proportion of methanol to the mixed fuel at a predetermined fuel-storing volume is low. Thus, a fuel cell system having a fuel tank storing highly concentrated or pure methanol is needed, to increase the energy quantity.

In U.S. Pat. No. 6,303,244, concentrated methanol and water are stored separately and mixed before delivery to a fuel cell stack, as illustrated in FIG. 2. Referring to FIG. 2, air for a reduction reaction is supplied to a cathode of a stack 4, and unused air is discharged from the cathode. Water as a reaction byproduct is collected in a water tank 6. Concentrated or pure methanol is stored in a fuel tank 7. Water and methanol used as fuel are stored in separate tanks 6 and 7, and are supplied by pumps 8 and 9 to a fuel mixer 10 where they are mixed before being supplied to the anode of the fuel cell stack 4.

However, the conventional direct liquid feed fuel cell needs pumps which operate mechanically and produce noise, making it unsuitable for use in a small portable electronic device. Further, in the case of a portable fuel cell, since the amount of fuel delivered is very small, it is difficult to select an active liquid delivery pump of the proper size.

SUMMARY OF THE INVENTION

The present invention provides a fuel delivery apparatus for delivering liquid fuel in a gaseous state. The fuel delivery apparatus includes a delivery structure capable of delivering fuel from a fuel tank using capillary force, and discharges gaseous fuel produced by heating the portion where the meniscus of the liquid fuel is formed, using a heater located at the end of the delivery structure, wherein the position of the meniscus of the liquid fuel is maintained by capillary force, and the amount of fuel supplied can be adjusted by controlling the temperature of the heater.

According to an aspect of the present invention, there is provided a fuel delivery apparatus including a plate stack formed by a plurality of plates and a heater, wherein the plate stack includes an inlet port for liquid fuel; a plurality of microchannels, the lower ends of which are connected to the inlet port; and an outlet port for fuel vaporized in the microchannels, connected to the upper ends of the microchannels, and the heater is located at the upper ends of the microchannels around the plate stack, to heat the liquid fuel in the microchannels.

According to another aspect of the present invention, there is provided a fuel delivery apparatus including: a housing having an inlet port for liquid fuel and an outlet port for gaseous fuel transformed from the liquid fuel; a porous material in the housing to store the liquid fuel in pores; and a heater located around the housing to heat the liquid fuel in the porous material.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
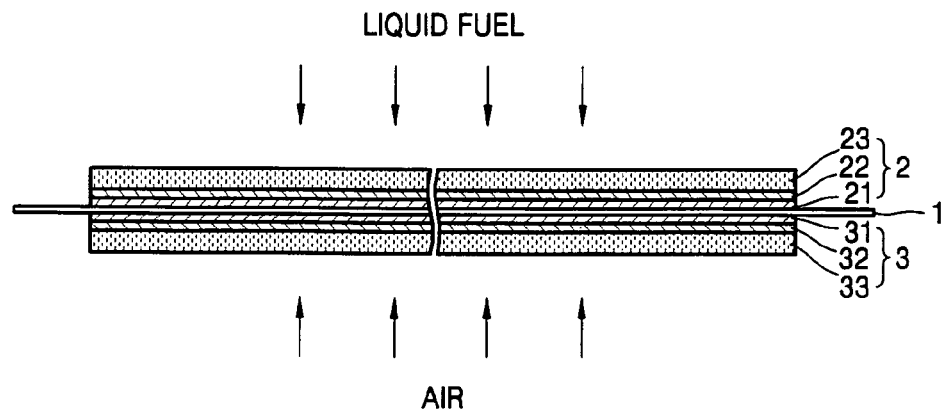
FIG. 1 is a cross-sectional view of a general direct liquid feed fuel cell.
Figure 2:
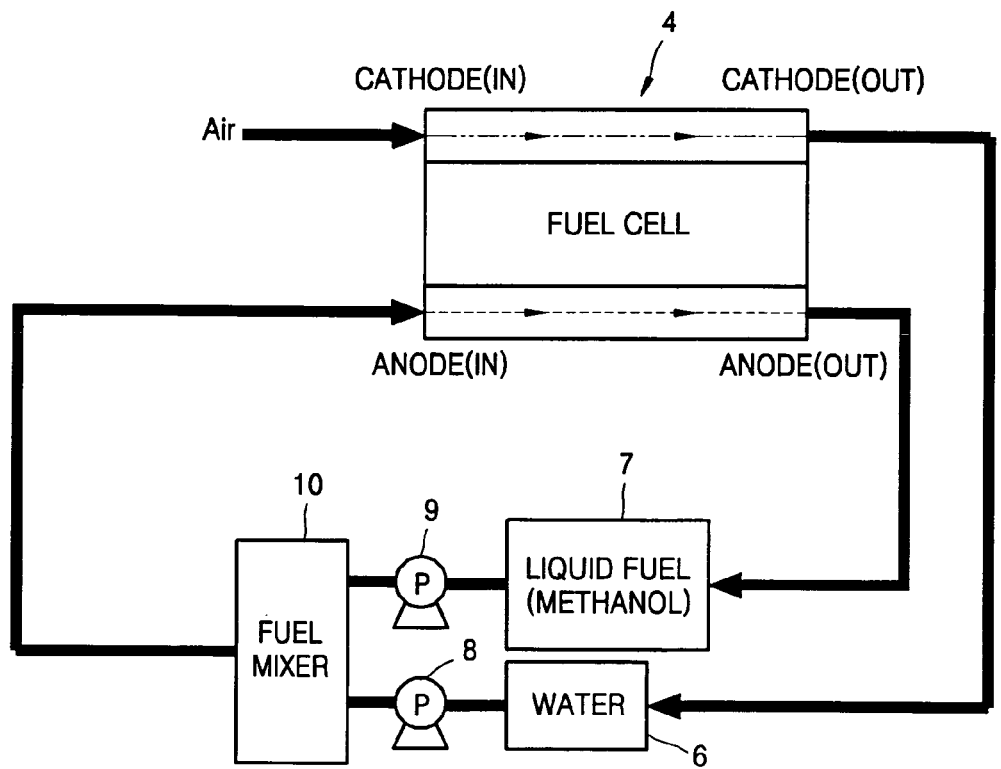
FIG. 2 is a schematic configuration of a conventional direct liquid feed fuel cell.
Figure 3:
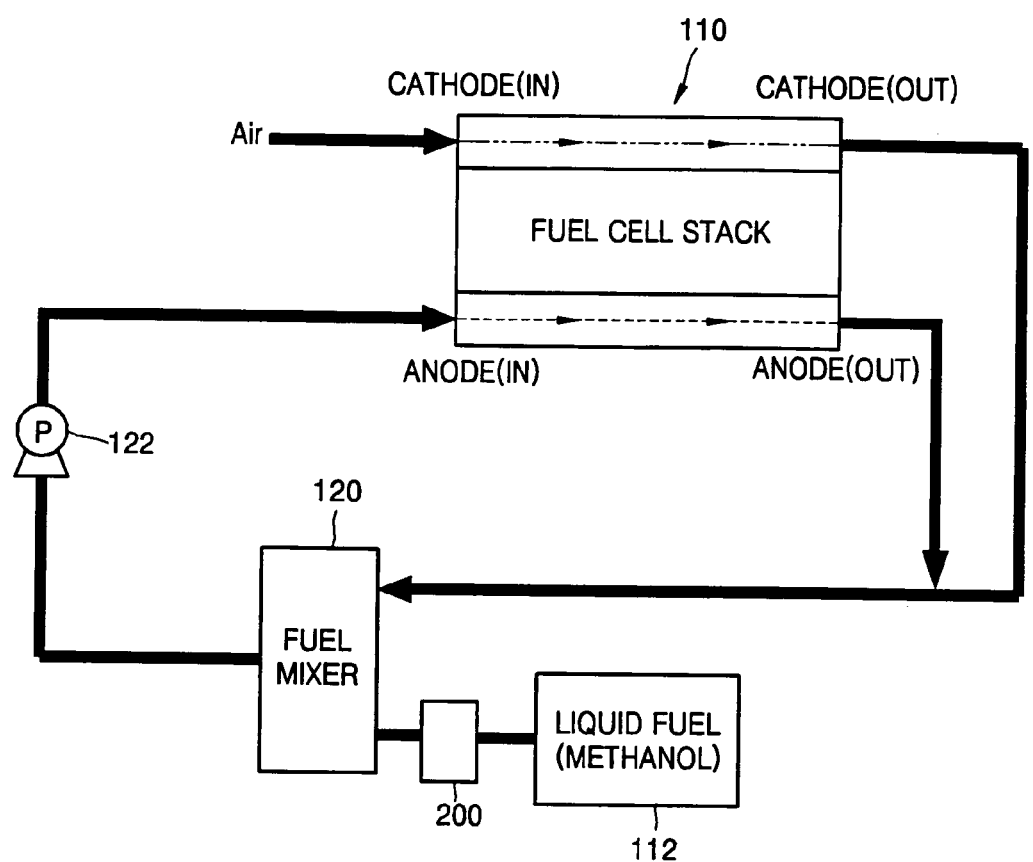
FIG. 3 is a schematic diagram of a direct liquid feed fuel cell system having a fuel delivery apparatus according to an embodiment of the present invention.

The schematic diagram of FIG. 3 illustrates a direct liquid feed fuel cell system according to an embodiment of the present invention that includes a fuel delivery apparatus. Operation of the direct liquid feed fuel cell system is described with reference to FIG. 3. Air for a reduction reaction is supplied to a cathode in a fuel cell stack 110, and water produced by the reaction at the cathode flows to a fuel mixer 120. Concentrated or pure methanol is stored in a fuel tank 112, and a predetermined amount of fuel in the fuel tank 112 is vaporized by a fuel delivery apparatus 200 to move to the fuel mixer 120. Liquid fuel mixed in the fuel mixer 120 is supplied to an anode by a pump 122. Unreacted fuel in the anode can be returned to the fuel mixer 120.

Figure 4:
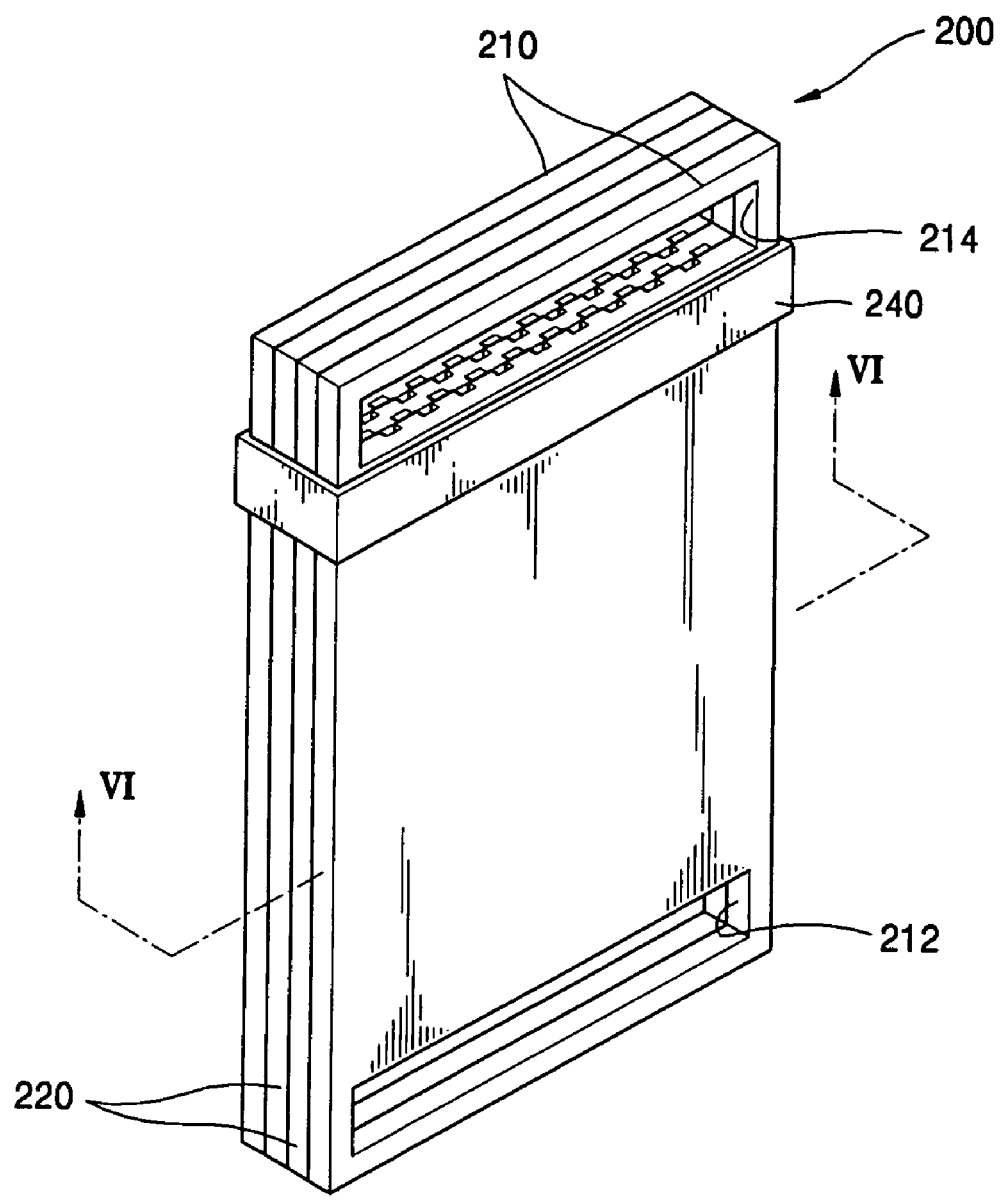
FIG. 4 is a perspective view of a fuel delivery apparatus according to an embodiment of the present invention.
Figure 5:
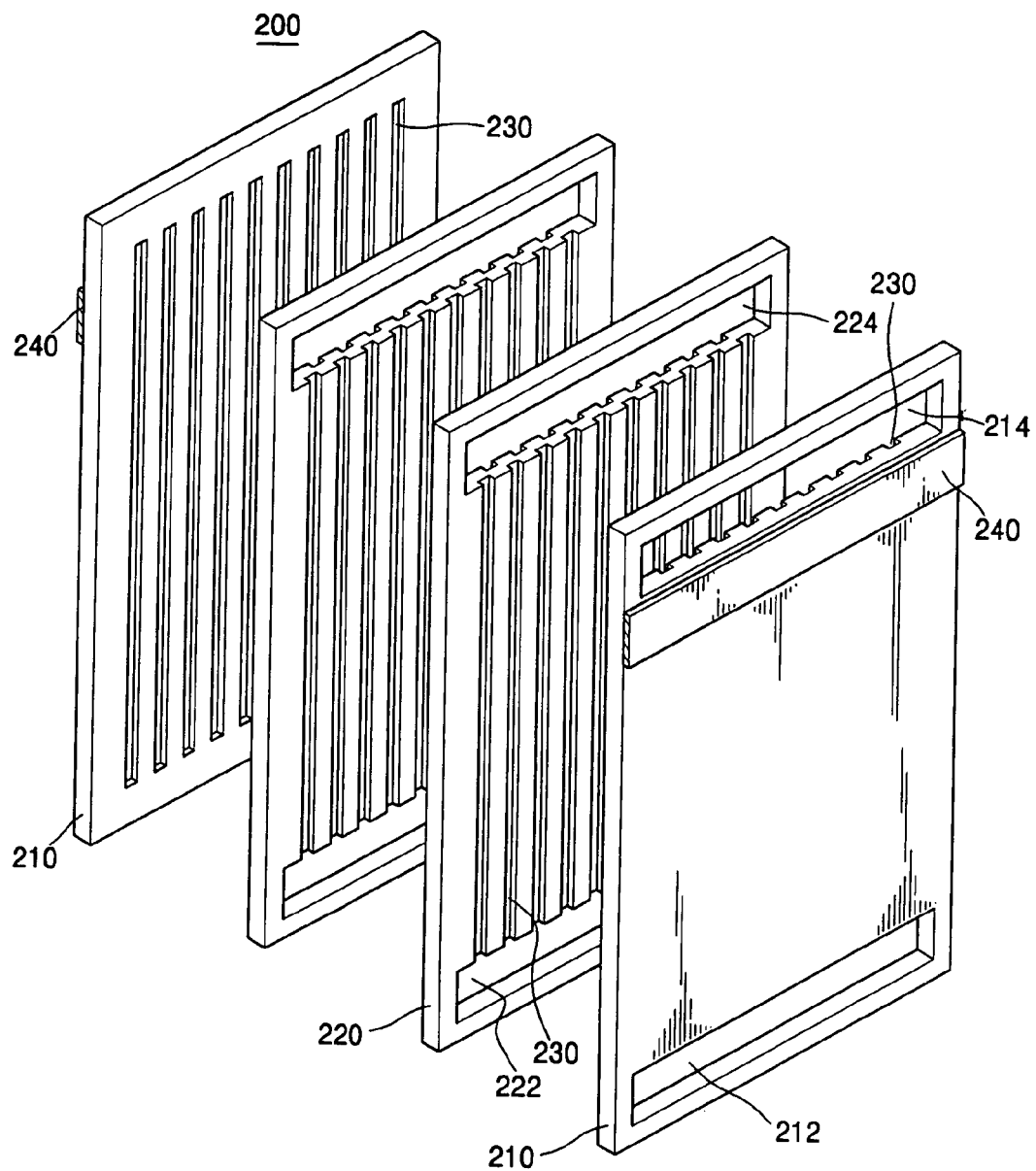
FIG. 5 is an exploded perspective view of the apparatus of FIG. 4.
Figure 6:
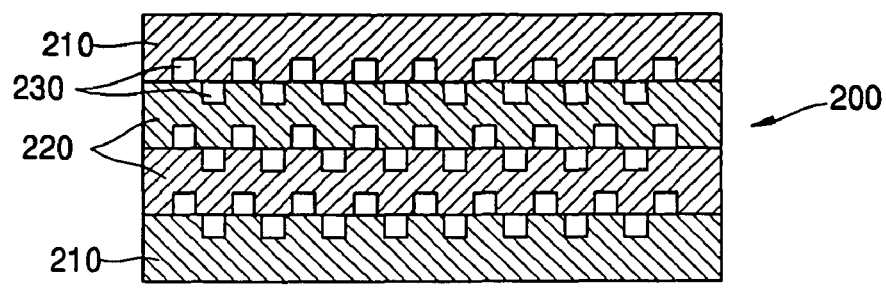
FIG. 6 is a cross-sectional view taken along the line VI-VI of FIG. 4.

FIG. 4 is a perspective view of a fuel delivery apparatus 200 according to an embodiment of the present invention, FIG. 5 is an exploded perspective view of the apparatus of FIG. 4, and FIG. 6 is a cross-sectional view taken along the line VI-VI of FIG. 4.

Referring to FIGS. 4 through 6, the fuel delivery apparatus 200 may include a plate stack formed of a plurality of rectangular-shaped plates. In one embodiment, the plate stack includes two end plates 210 and one or more double-sided plates 220 that are positioned between the two end plates 210.

The two end plates 210 each have an inlet portion 212 for receiving liquid fuel from a fuel tank 112, and an outlet portion 214 for discharging fuel that is vaporized in microchannels 230 via heat supplied from an external heater 240. The outlet portion 214 may be formed in the same end plate 210 in which the inlet portion 212 is formed. A plurality of microchannels 230, which act as capillaries, are formed in the inner surfaces of the end plates 210. The microchannels 230, which provide a conduit between the inlet portion 212 and the outlet portion 214, extend substantially parallel each other along the length of each end plate 210.

The double-sided plates 220 each have an inlet portion 222 and an outlet portion 224 corresponding respectively to the inlet portion 212 and the outlet portion 214, and both surfaces having a plurality of microchannels 230 connected to the inlet portion 222 and the outlet portion 224. The microchannels 230 formed on both sides of each double-side plate 220 may be configured and positioned as described above.

The diameter of the microchannels 230 is of the order of tens or hundreds of micrometer. When the inlet portion 212 and/or the outlet portion 214 is formed at the end plate 210, the microchannels 230 of the end plate 210 are formed such that they are connected to the inlet portion 212 and/or the outlet portion 214. In an embodiment in which either the inlet portion 212 and/or the outlet portion 214 is not formed at the end plate 210, the microchannels 230 of the end plate 210 may extend such that they are exposed through the inlet portion 222 and/or the outlet portion 224 of an adjacent-double-sided plate 220. The inlet portions 212 and 222 form an inlet port, and the outlet portions 214 and 224 form an outlet port.

The plate 210, 220 having microchannels 230 can be manufactured from a silicon substrate using a semiconductor process.

Alternatively, the plate 210, 220 having microchannels 230 can be manufactured by extruding polymer resin such as polyethylene through a mold. The fuel delivery apparatus 200 manufactured using polymer resin can be easily installed due to its flexibility. Although the inlet portion 212 is shown and described as being formed in the same end plate 210 as the outlet portion 214, the inlet portion 212 may be formed in the other end plate 210.

A heater 240 may be located just below the outlet portion 214 and positioned to encircle a circumference of the plate stack. The heater 240 is used to vaporize predetermined amounts of methanol released from the fuel tank 112, and may be made of an electrical resistance wire.

In use, methanol from the fuel delivery apparatus 200 flows, via capillary action, along the microchannels 230 toward the outlet portions 214 and 224. Heat from the heater 240 vaporizes methanol in the microchannels 230 just before the methanol enters the outlet portions 214 and/or 224. The vaporized methanol then discharges through the outlet portions 214 and 224, and is thereafter cooled into liquid form within the fuel mixer 120. In spite of vaporization, methanol is maintained at a top position in the microchannels 230 due to capillary force, and the fuel delivery apparatus 200 actively adjusts the amount of methanol vaporized using the heater 240.

Figure 7:
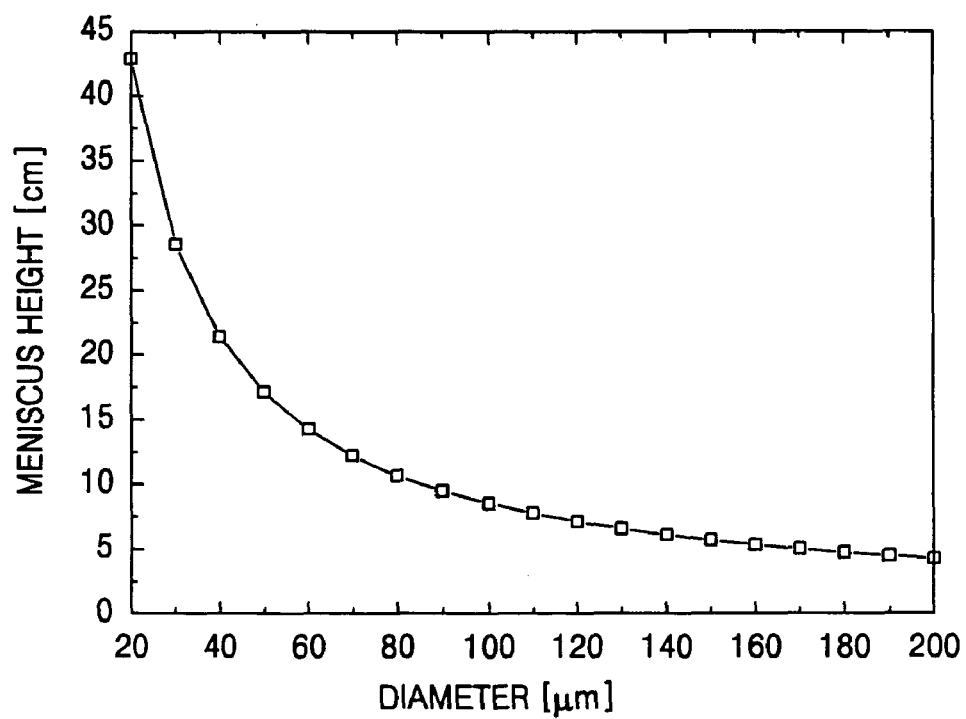
FIG. 7 is a graph illustrating the meniscus height of fuel according to the diameter of microchannels.

FIG. 7 is a graph illustrating how the meniscus height of methanol varies depending on the diameter of the microchannels.

Equation 1, for example, is a simplified equation that illustrates the relationship between the radius of the microchannels and the capillary force:

$$\Delta P = \frac{2\sigma}{r} \quad (1)$$

where $\Delta P$ is the difference in pressure in the interface, which means the magnitude of force capable of delivering fuel, $\sigma$ is a surface tension, and $r$ is the radius of one of the microchannels.

Fuel rises through the microchannels due to a difference in pressure, and the relationship between the radii of several microchannels and the possible meniscus height or delivery distance of liquid fuel is illustrated in FIG. 7. When the height of the microchannels is less than the possible meniscus height, the meniscus forms and stands at the end of the microchannels. When heating the portion where the meniscus is formed, liquid fuel is vaporized and discharged, and the height of the interface between methanol and air is consistently maintained by the capillary force. The meniscus height is almost not affected by the installation direction, because the capillary force is generally superior to gravity, especially as the radius of the microchannels decreases.

Figure 8:
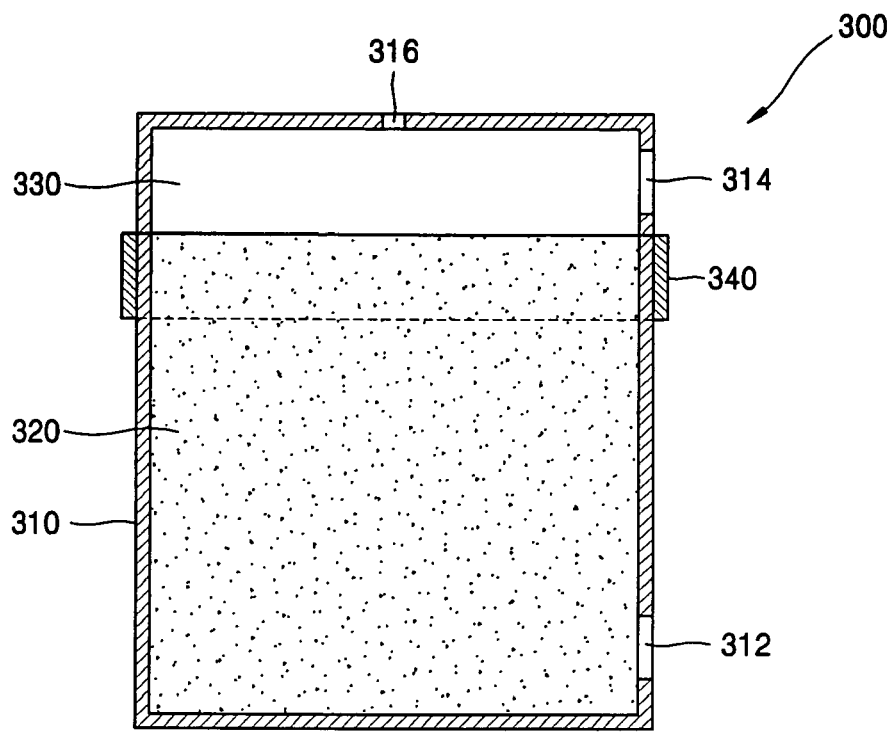
FIG. 8 is a cross-sectional view of a fuel delivery apparatus according to another embodiment of the present invention.

FIG. 8 is a cross-sectional view of a fuel delivery apparatus 300 according to another embodiment of the present invention. In this figure, like reference numerals denote like elements in the drawings, and thus their description will not be repeated.

Referring to FIG. 8, the fuel delivery apparatus 300 has a housing 310 filled with a porous material 320, for example sponge. The sponge 320 has pores into which methanol can fill. Pores of the sponge 320 may be interconnected to form micro paths.

The upper portion of the housing 310 is an empty space 330. A heater 340 made of electrical resistance wire is installed just below the empty space 330, around the housing 310. The heater 340 heats the interface between methanol and air, to vaporize the methanol in the sponge 320, thereby vaporizing liquid methanol into a gaseous state. An upper portion of the housing 310 has an outlet port 314 for discharging methanol vaporized by the heater 340. An injection port 316 can be formed at the upper portion of the housing 310 instead of the inlet port 312, allowing the fuel tank 112 in FIG. 3 to be omitted.

When the heater 340 locally heats the housing 310, heat transfers to the interior and methanol is vaporized to move toward the empty space 330 in the housing 310. Then, the gaseous methanol moves to the fuel mixer 120 through the outlet port 314. Methanol is continuously brought to the upper end of the sponge 320 due to capillary force, in spite of its vaporization. The fuel delivery apparatus 300 actively adjusts the amount of methanol vaporized by means of the heater 340.

Figure 9:
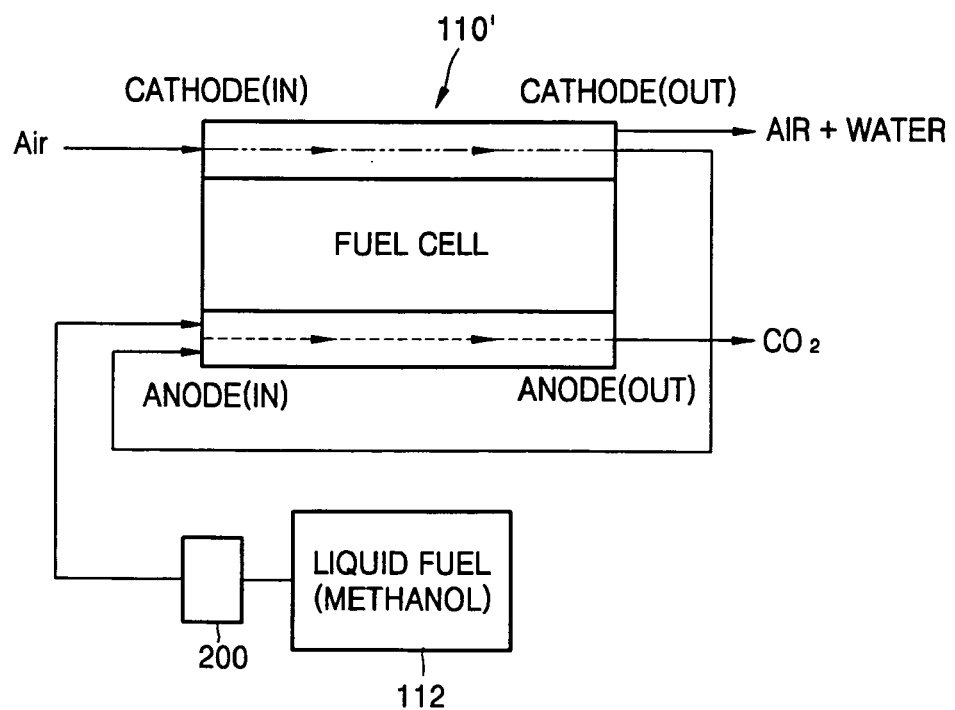
FIG. 9 is a schematic configuration of another direct liquid feed fuel cell system including a fuel delivery apparatus according to the present invention.

FIG. 9 is a schematic configuration of another direct liquid feed fuel cell system including a fuel delivery apparatus according to the present invention. Like reference numerals denote like elements in FIGS. 9 and 3, and thus their description will not be repeated.

Referring to FIG. 9, air for a reduction reaction is supplied to the cathode of a portable fuel cell 110' of monopolar plate type, and water produced by the reaction in the cathode moves partially to the anode. The fuel tank 112 stores pure methanol, a predetermined amount of which is vaporized by the fuel delivery apparatus 200 and supplied to the anode. A portion of the water and $CO_2$ produced during the reactions in the cell can be discharged to the atmosphere.

As described above, the fuel delivery apparatus according to the embodiments of the present invention can deliver fuel to the anode or fuel mixer of a fuel cell using capillary force instead of a mechanical pump. Further, the supply rate of fuel can be adjusted by controlling the temperature of the heater.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A fuel delivery apparatus for a direct liquid feed fuel cell, comprising:
    a plate stack having at least one double-sided plate positioned between opposing end plates;
    wherein the double-sided plate consists essentially of microchannels disposed on both surfaces, and each end plate consists essentially of microchannels disposed on their respective inner surfaces,
    wherein the plate stack comprises:
        an inlet port for liquid fuel formed in the double-sided plate;
        the plurality of microchannels having upper ends and lower ends to deliver liquid fuel from the lower ends to the upper ends due to capillary force, the lower ends of which are connected to the inlet port; and
        an outlet port for fuel vaporized in the microchannels, the outlet port connected to the upper ends of the microchannels, and
    an external heater located proximate the upper ends of the microchannels to vaporize liquid fuel proximate an interface between the outlet port and the upper ends of the microchannels.

2. The fuel delivery apparatus of claim 1, wherein the opposing end plates have a first portion of the microchannels formed on their inner surfaces,
    wherein the double-sided plate has a second portion of the microchannels formed on both its opposing surfaces,
    wherein the end plates have an inlet portion forming the inlet port and an outlet portion forming the outlet port, and
    wherein the double-sided plate has an inlet portion connected to the inlet portion of the end plates and an outlet portion connected to the outlet portion of the end plates.

3. The fuel delivery apparatus of claim 1, wherein the end plates and the double-sided plate each comprise silicon.

4. The fuel delivery apparatus of claim 1, wherein the end plates and the double-sided plate each comprise polymer resin.

5. The fuel delivery apparatus of claim 4, wherein the microchannels of the plates are formed by extrusion.

6. The fuel delivery apparatus of claim 2, wherein a length of each microchannel is less than a predetermined delivery distance of liquid fuel.

7. The fuel delivery apparatus of claim 6, wherein the predetermined delivery distance of liquid fuel is a height of a liquid fuel meniscus calculated for a pre-determined radius of microchannel.

8. The fuel delivery apparatus of claim 1, wherein the microchannels are parallel to one another.

* * * * *